US012730193B2

(12) United States Patent
Nguyen et al.

(10) Patent No.: US 12,730,193 B2
(45) Date of Patent: Sep. 8, 2026

(54) RETROREFLECTIVE MECHANISMS ON OPTICAL RANGING, PROXIMITY, AND IMAGE SENSORS TO REDUCE OPTICAL NOISE FROM UNWANTED SOURCES

(71) Applicant: STMicroelectronics International N.V., Geneva (CH)

(72) Inventors: Wei Liang Keith Nguyen, Singapore (SG); Jelah Nieva Caceres, Singapore (SG)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 543 days.

(21) Appl. No.: 18/461,056

(22) Filed: Sep. 5, 2023

(65) Prior Publication Data

US 2025/0076465 A1 Mar. 6, 2025

(51) Int. Cl.
*G01S 7/481* (2006.01)
*G01S 7/487* (2006.01)
(Continued)

(52) U.S. Cl.
CPC .......... *G01S 7/4813* (2013.01); *G01S 7/4876* (2013.01); *G01S 7/493* (2013.01); *G02B 5/122* (2013.01); *G02B 5/126* (2013.01)

(58) Field of Classification Search
None
See application file for complete search history.

(56) References Cited

U.S. PATENT DOCUMENTS 9,151,829 B2 10/2015 Campbell
10,537,284 B1 1/2020 Ruh et al.
(Continued)

FOREIGN PATENT DOCUMENTS

CN 114879291 A * 8/2022 ............. G02B 5/122

OTHER PUBLICATIONS

Chang et al., "Tunable Micro Cat's Eye Array in an Optical Identification System and Comparison of Different ID Tags," in IEEE Journal of Selected Topics in Quantum Electronics, vol. 21, No. 4, pp. 130-136, Jul.-Aug. 2015, Art No. 2701207, doi: 10.1109/JSTQE.2014.2381513.

*Primary Examiner* — Eric L Bolda
(74) *Attorney, Agent, or Firm* — Alston & Bird LLP

(57) ABSTRACT

An example electronic system utilizing an optical ranging, proximity, and/or image sensor configured with retroreflective mechanisms to reduce unwanted optical noise at an optical radiation receiver are provided. The example ranging, proximity, and/or image sensor is configured to include a housing cap having a transmission opening and a receiving opening. The example sensor may further include an optical radiation source positioned to direct ranging optical radiation through the transmission opening toward a target object. An optical radiation receiver is positioned to receive ranging optical radiation reflected off the target object through the receiving opening. A retroreflective mechanism implemented on a surface of the housing cap directs unwanted optical noise back towards an unwanted optical noise source and away from the optical radiation receiver. Properties of the target object may be determined based on one or more properties of the ranging optical radiation received at optical radiation receiver.

20 Claims, 6 Drawing Sheets

(51) Int. Cl.

| | |
|---|---|
| ***G01S 7/493*** | (2006.01) |
| ***G02B 5/122*** | (2006.01) |
| ***G02B 5/126*** | (2006.01) |

(56) References Cited

U.S. PATENT DOCUMENTS

| | | | | |
|---|---|---|---|---|
| 2005/0185283 | A1 | 8/2005 | Bellenkil et al. | |
| 2023/0086536 | A1 | 3/2023 | Li et al. | |
| 2023/0123150 | A1 | 4/2023 | Burge | |
| 2023/0221417 | A1* | 7/2023 | Asami | G01S 7/4817 356/4.01 |

* cited by examiner

RETROREFLECTIVE MECHANISMS ON OPTICAL RANGING, PROXIMITY, AND IMAGE SENSORS TO REDUCE OPTICAL NOISE FROM UNWANTED SOURCES

TECHNOLOGICAL FIELD

Embodiments of the present disclosure relate generally to noise reduction mechanisms on an optical sensor, for example, an optical ranging sensor, an optical proximity sensor, and/or an optical image sensor, and more particularly, to utilizing retroreflective mechanisms on the surfaces of an optical sensor housing cap to reduce optical noise from unwanted sources.

BACKGROUND

Various example embodiments address technical problems associated with optical noise from unwanted sources in an optical ranging, proximity, or image sensor. During operation of an optical ranging sensor, light may be received from various sources, including reflections off the target object, reflections off various surfaces of the optical ranging sensor and its external cover, and/or light from ambient sources. Light from unwanted sources, such as the reflections off various surfaces of the optical ranging sensor and/or light from ambient sources, increases the noise received at the optical radiation receiver and reduces the signal-to-noise ratio (SNR) of the reflections off the target object. The increased noise may lead to inaccurate and/or inconsistent readings from an optical ranging sensor.

Applicant has identified many technical challenges and difficulties associated with reducing the optical noise received at an optical radiation receiver of an optical ranging, proximity, or image sensor. Through applied effort, ingenuity, and innovation, Applicant has solved problems related to the receipt of optical noise in an optical ranging sensor by developing solutions embodied in the present disclosure, which are described in detail below.

BRIEF SUMMARY

Various embodiments are directed to an example optical ranging sensor and an example electronic system comprising an optical ranging sensor configured to reduce unwanted optical noise at an optical radiation receiver. An example optical ranging sensor configured to determine a proximity of a target object may comprise a housing cap, comprising a transmission opening and a receiving opening. The example optical ranging sensor may further comprise an optical radiation source positioned to direct ranging optical radiation through the transmission opening toward the target object, an optical radiation receiver positioned to receive ranging optical radiation reflected off the target object through the receiving opening, and a retroreflective mechanism implemented on a surface of the housing cap. In some embodiments, the retroreflective mechanism directs unwanted optical noise back towards an unwanted optical noise source and away from the optical radiation receiver. The proximity of the target object may be determined based on one or more properties of the ranging optical radiation received at optical radiation receiver.

In some embodiments, the housing cap further comprises a top surface opposite the optical radiation receiver, wherein the retroreflective mechanism is disposed such that the top surface of the housing cap is substantially covered.

In some embodiments, a portion of the housing cap between the receiving opening and the transmission opening comprises the retroreflective mechanism.

In some embodiments, one or more opening surfaces defining the transmission opening and the receiving opening comprise the retroreflective mechanism.

In some embodiments, one or more barrier surfaces positioned between the optical radiation source and the optical radiation receiver comprise the retroreflective mechanism.

In some embodiments, the optical ranging sensor may further comprise a receiving optical structure positioned between the optical radiation receiver and the target object, wherein the receiving optical structure is configured to direct the ranging optical radiation at the optical radiation receiver.

In some embodiments, the optical ranging sensor may further comprise a transmitting optical structure positioned between the optical radiation source and the target object, wherein the transmitting optical structure is configured to direct the ranging optical radiation at the target object.

In some embodiments, the retroreflective mechanism comprises a corner retroreflector.

In some embodiments, the retroreflective mechanism comprises a cat's eye retroreflector.

In some embodiments, the retroreflective mechanism comprises at least one of retroreflective paint and retroreflective tape.

In some embodiments, the one or more properties of the ranging optical radiation comprises at least one of a time-of-flight of the optical radiation and an intensity of the optical radiation.

In some embodiments, the proximity of the target object includes at least one of a distance of the target object from the optical ranging sensor, a position of the target object relative to the optical ranging sensor, and a speed of the target object.

An example electronic system configured to determine a proximity of a target object is further provided. In some embodiments, the example electronic system may comprise an external cover and an optical ranging sensor disposed on an interior side of the external cover, opposite the target object. The optical ranging sensor may comprise a housing cap, comprising a transmission opening and a receiving opening, an optical radiation source positioned to direct ranging optical radiation through the transmission opening toward the target object, an optical radiation receiver positioned to receive ranging optical radiation reflected off the target object through the receiving opening, and a retroreflective mechanism disposed on a surface of the housing cap, wherein the retroreflective mechanism directs unwanted optical noise back towards an unwanted optical noise source away from the optical radiation receiver. In some embodiments, the proximity of the target object is determined based on one or more properties of the ranging optical radiation.

In some embodiments, the housing cap further comprises a top surface opposite the optical radiation receiver, wherein the retroreflective mechanism is disposed such that the top surface of the housing cap is substantially covered.

In some embodiments, a portion of the housing cap between the receiving opening and the transmission opening comprises the retroreflective mechanism.

In some embodiments, one or more opening surfaces defining the transmission opening and the receiving opening comprise the retroreflective mechanism.

In some embodiments, one or more barrier surfaces positioned between the optical radiation source and the optical radiation receiver comprise the retroreflective mechanism.

In some embodiments, the retroreflective mechanism comprises at least one of a corner retroreflector and a cat's eye retroreflector.

In some embodiments, the retroreflective mechanism comprises at least one of retroreflective paint and retroreflective tape.

In some embodiments, the proximity of the target object includes at least one of a distance of the target object from the optical ranging sensor, a position of the target object relative to the optical ranging sensor, and a speed of the target object.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
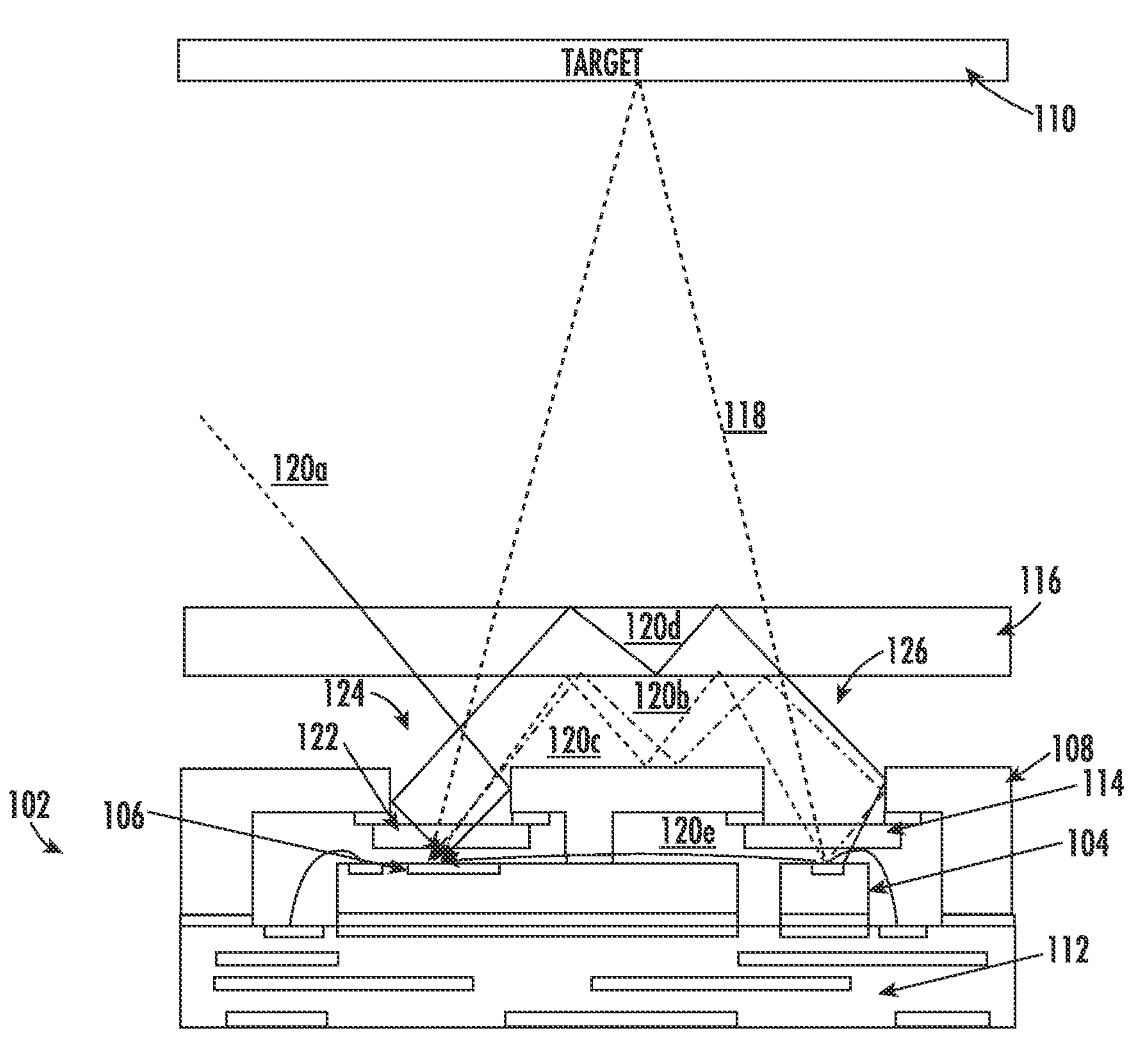
FIG. 1 depicts a cross-section view of an example optical ranging system receiving unwanted optical noise from various sources at the optical radiation receiver in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with receiving optical noise from unwanted sources at an optical radiation receiver of an optical ranging, proximity, or image sensor. As understood by those of skill in the field to which the present disclosure pertains, there are numerous example scenarios in which the accuracy and consistency of an optical ranging, proximity, or image sensor may be improved by reducing the amount of unwanted optical noise received at the optical radiation receiver.

During operation of an optical ranging sensor ranging optical radiation is transmitted by an optical radiation source. The ranging optical radiation may be directed through one or more transmitting optical structures, display screens, cover glass, and/or lens toward a target object. A portion of the ranging optical radiation may be reflected by the target object and may be received by an optical radiation receiver. The received ranging optical radiation may be correlated with the transmitted ranging optical radiation to determine certain characteristics related to the proximity of the target object, for example, the distance of the target object, position of the target object, motion of the target object, and/or the speed of the target object.

In addition to the ranging optical radiation reflected off the target object, optical radiation may be received from various unwanted sources. Optical radiation received from unwanted sources, or unwanted optical noise, may diminish the reflected ranging optical radiation. For example, optical radiation from unwanted sources, such as but not limited to reflections off various surfaces of the optical ranging sensor, and/or external cover, and/or any object not including the target, and/or light from ambient sources, increases the noise received at the optical radiation receiver. An increase in unwanted optical noise equates to a reduction in the signal-to-noise ratio (SNR) of the ranging optical radiation reflected off the target object. As the SNR is reduced due to unwanted optical noise, the proximity output from the optical ranging sensor becomes increasingly inaccurate and inconsistent.

In some examples, mitigating the receipt of unwanted optical noise has included selection of housing materials and positioning of reflective surfaces. For example, an optical ranging sensor manufacturer may select materials to absorb one or more wavelengths of light. However, such materials often have material limitations with respect to the necessary characteristics of a housing cap. In addition, an optical ranging sensor manufacturer may select materials and/or a surface that randomly diffuses any incident light. Such an option may randomly reflect light towards the optical radiation receiver, among other things.

The various example embodiments described herein utilize various techniques to direct unwanted optical noise away from the optical radiation receiver of an optical ranging sensor. For example, in some embodiments, one or more retroreflective mechanisms may be positioned on various surfaces of the housing cap of the optical ranging sensor to limit the amount of unwanted optical noise received at the optical sensor.

In general, retroreflective mechanisms return directed optical radiation in the direction of the optical radiation source. By directing optical radiation towards the optical radiation source, the optical radiation is directed away from the optical radiation receiver. Retroreflective mechanisms may include corner retroreflectors, cat's eye retroreflectors, retroreflective paints, retroreflective tapes, and so on. In some embodiments, the retroreflective mechanisms may be added to all surfaces of the housing cap, including the top surface of the housing cap, the interior surfaces of the housing cap, the opening surfaces of the housing, the barrier surfaces of the housing cap, and so on. Such retroreflective mechanisms may be incorporated into the surfaces of the housing cap during the housing cap formation process.

In addition, in some embodiments, the retroreflective mechanisms may be strategically positioned on surfaces of the housing cap wherein the majority of the unwanted optical noise is reflecting off into the optical radiation receiver. For example, in some embodiments, the entire top surface of the housing cap may comprise retroreflective mechanisms, while the interior surfaces, the opening surfaces, and/or the barrier surfaces do not comprise retroreflective mechanisms. In some example embodiments, only the top surface between the transmission opening and the receiving opening in the housing cap may comprise retroreflective mechanisms.

By utilizing retroreflective mechanisms on one or more surfaces of the housing cap of an optical ranging, proximity, or image sensor, the amount of unwanted optical noise received at the optical radiation receiver may be drastically reduced. Reduction in the unwanted optical noise at the optical radiation receiver may improve the performance and overall consistency of the optical ranging, proximity, or image device. As a result of the herein described example embodiments and in some examples, the effectiveness of the optical ranging, proximity, or image sensor may be greatly improved.

Referring now to FIG. 1, an example ranging system 100 comprising an optical ranging sensor 102 operating without retroreflective features is shown. As depicted in FIG. 1, the optical ranging system 100 includes an optical ranging sensor 102 comprising an optical radiation source 104 configured to direct ranging optical radiation 118 through a transmitting optical structure 114 (e.g., lens) placed in a transmission opening 126 of a housing cap 108 and through an external cover 116 (e.g., screen), toward a target object 110. The ranging optical radiation 118 is reflected by the target object 110 back through a receiving opening 124 in the housing cap 108 and a receiving optical structure 122, to be received at an optical radiation receiver 106. As further depicted in FIG. 1, the optical radiation source 104 and the optical radiation receiver 106 are electrically connected to a substrate 112 (e.g., printed circuit board). In addition, the housing cap 108 is attached to the substrate 112. As illustrated in FIG. 1, various sources of unwanted optical radiation (e.g., ambient unwanted optical noise 120*a*, crosstalk unwanted optical noise 120*b*-120*e*) are reflected off various surfaces of the housing cap 108 and received at the optical radiation receiver 106.

As depicted in FIG. 1, the example optical ranging sensor 102 includes an optical radiation source 104. An optical radiation source 104 is any device, bulb, semiconductor, diode, laser, or other photon-emitting structure configured to generate ranging optical radiation 118 and positioned to direct the ranging optical radiation 118 toward a target object 110. An optical radiation source 104 may comprise any light source, such as a laser diode, a light-emitting diode, bulb, semiconductor device, or other photon-emitting structure. In some embodiments, an optical radiation source 104 may comprise a semiconductor laser diode, for example, a vertical cavity surface emitting laser (VCSEL) and/or an edge emitting laser diode. In general, an optical radiation source 104 may output a coherent light beam upon receipt of a current. In an optical ranging sensor 102, the proximity of target objects 110 in an environment may be measured by generating pulsed or continuous wave ranging optical radiation 118, receiving the reflected pulsed or continuous wave ranging optical radiation 118, and determining the time-of-flight of the pulsed or continuous wave ranging optical radiation 118. The proximity of target objects 110 may include the distance of the target object 110 from the optical ranging sensor 102, the position of the target object 110, the speed of the target object 110, the direction of motion of the target object 110, and other similar characteristics related to the position of the target object 110 in the environment.

As further depicted in FIG. 1, the example optical ranging sensor 102 includes an optical radiation receiver 106. An optical radiation receiver 106 may be any set of one or more photodiodes, integrated circuits, devices, sensors, light sensing diodes, or other structures that produce an electric signal as a result of light received at the optical radiation receiver 106. For example, the electric signal output by the optical radiation receiver 106 may increase as the number of photons that strike the optical radiation receiver 106 per second increases. In such an embodiment, the electric current output from the optical radiation receiver 106 may be used to determine the intensity or amplitude of the ranging optical radiation 118 striking the optical radiation receiver 106. In some embodiments, the optical radiation receiver 106 may be a light sensitive semiconductor diode that creates an electron-hole pair at the p-n junction when a photon of sufficient energy strikes the optical radiation receiver 106.

As depicted in FIG. 1, the optical radiation receiver 106 is electrically connected to the substrate 112. In some embodiments, the optical radiation receiver 106 may be further electrically connected to a processing device. The processing device may be configured to receive the electrical signal generated by the optical radiation receiver 106 representing the intensity or other properties of optical radiation received at the optical radiation receiver 106. In some embodiments, the processing device may determine a time-of-flight of the ranging optical radiation 118 based on the electrical signal received by the optical radiation receiver 106 and determine one or more characteristics related to the physical position of the target object 110.

As further depicted in FIG. 1, the optical ranging sensor 102 includes a substrate 112. The substrate 112 is any structure configured to support the attachment of the optical ranging sensor 102, including the housing cap 108. In some embodiments, the substrate 112 may comprise a printed circuit board (PCB) or ceramic alumina including electrical connections connecting the optical ranging sensor 102 to a processor, controller, analog-to-digital converter, or other electrical components.

As further depicted in FIG. 1, the example optical ranging sensor 102 includes a housing cap 108. The housing cap 108 may be any package, cover, container, or other covering configured to protect the internal electrical components and circuitry of the optical ranging sensor 102. A housing cap 108 may comprise plastic, ceramic, or other protective material. The housing cap 108 is attached to the substrate 112 to provide stability and further protect the internal electrical components of the optical ranging sensor 102. In some embodiments, the housing cap 108 may further include conductive pins and/or conductive pads to provide an electrical connection to the internal electrical components.

As further depicted in FIG. 1, the housing cap 108 includes a transmission opening 126 and a receiving opening 124. Openings in the housing cap 108 may enable the transmission and receipt of optical radiation into and out of the optical ranging sensor 102. For example, the transmission opening 126 may be aligned with the emission cone of the optical radiation source 104. The ranging optical radiation 118 from the optical radiation source 104 may pass through the transmission opening 126 toward the target object 110. Similarly, a receiving opening 124 may enable the receipt of the reflected ranging optical radiation 118 into the optical ranging sensor 102, for example, to be received by the optical radiation receiver 106 and analyzed by a processor or other device.

As further depicted in FIG. 1, the optical radiation source 104 is configured to output ranging optical radiation 118. The ranging optical radiation 118 may be any optical signal transmitted by the optical ranging sensor 102 toward a target object 110 to determine characteristics related to the proximity of the target object 110. In some embodiments, the ranging optical radiation 118 may be a pulsed laser signal. For example, the optical radiation source 104 may be configured to generate uniform laser pulses. Utilizing a pulsed laser signal may enable a controller to determine the time of flight of the ranging optical radiation 118 once the ranging optical radiation is received at the optical radiation receiver 106. In some embodiments, the ranging optical radiation 118 may be a continuous wave laser signal. In such embodiments, the continuous wave laser signal may enable a controller to determine proximity of a target object 110 by correlating the proximity of the target object 110 with the phase change in ranging optical radiation 118 as it is emitted by the optical radiation source 104, reflected off the target object 110, and subsequently received by the optical radiation receiver 106.

As further depicted in FIG. 1, the ranging optical radiation 118 is configured to pass through the transmission opening 126. As shown in FIG. 1, in some embodiments, the transmission opening 126 includes a transmitting optical structure 114. A transmitting optical structure 114 is any transparent and/or semi-transparent device configured to enable the passage of ranging optical radiation 118. In some embodiments, the transmitting optical structure 114 may comprise an optical lens, assembly of optical lenses, or other optical device configured to distort the ranging optical radiation 118. For example, the transmitting optical structure 114 may point, focus, or direct the ranging optical radiation 118 at the target object 110 or a dynamic portion of the target object 110. In some embodiments, the transmitting optical structure 114 may be a transparent device positioned to prevent dust, dirt, and other impurities from entering the internal cavity of the optical ranging sensor 102. In some embodiments, the transmitting optical structure 114 may be a band pass filter to limit the ranging optical radiation 118 emitted by optical radiation source 104 to a narrow range of wavelengths. In some embodiments, the transmitting optical structure 114 may be positioned on the external surface of the housing cap 108.

As further depicted in FIG. 1, the reflected ranging optical radiation 118 is configured to reflect from the target object 110 and pass through the receiving opening 124. As shown in FIG. 1, in some embodiments, the receiving opening 124 includes a receiving optical structure 122. A receiving optical structure 122 is any transparent and/or semi-transparent device configured to enable the passage of reflected ranging optical radiation 118. In some embodiments, the receiving optical structure 122 may comprise an optical lens, assembly of optical lenses, or other optical device configured to distort the ranging optical radiation 118, such that the ranging optical radiation 118 is focused on the optical radiation receiver 106. In some embodiments, the receiving optical structure 122 may be a transparent device positioned to prevent dust, dirt, and other impurities from entering the internal cavity of the optical ranging sensor 102. In some embodiments, the receiving optical structure 122 may be a band pass filter to prevent noise of an unwanted wavelength from reaching the optical radiation receiver 106. In some embodiments, the receiving optical structure 122 may be positioned on the external surface of the housing cap 108.

As further depicted in FIG. 1, the optical ranging system 100 may include an external cover 116, such as an electronic display screen. The external cover 116 is any transparent and/or semi-transparent device positioned external to the optical ranging sensor 102 through which the ranging optical radiation 118 passes to encounter the target object 110.

In some embodiments, the external cover 116 may be the electronic display screen of an electronic device, such as a mobile phone. In such an embodiment, the optical ranging sensor 102 transmits and receives ranging optical radiation 118 through the electronic display screen to determine proximity characteristics of a target object 110 external to the mobile device. An electronic display screen may be any digital display, screen, monitor, or other device configured to output information in visual form based on a received electronic signal. An electronic display screen may be transparent or semi-transparent to certain wavelengths of light, such that reflected ranging optical radiation 118 may be received by the optical radiation receiver 106 behind or under the electronic display screen.

In some embodiments, the external cover 116 may be any protective cover that separates the sensor from external elements. In such an embodiment, the optical ranging sensor 102 transmits and receives ranging optical radiation 118 through the external cover 116 to determine proximity characteristics of a target object 110 external to the mobile device. An external cover 116 may be any barrier protecting the sensor and other components from any foreign material such as but not limited to dust, water and oil. An external cover 116 may be transparent or semi-transparent to certain wavelengths of light such that reflected ranging optical radiation 118 may be received by the optical radiation receiver 106 behind or under the external cover 116.

As further depicted in FIG. 1, the ranging optical radiation 118 transmitted by the optical ranging sensor 102 is reflected off a target object 110 and returns to the optical radiation receiver 106 of the optical ranging sensor 102. A target object 110 may be any object, structure, person, entity, or other item positioned in the line-of-sight of the ranging optical radiation 118 transmitted by the optical ranging sensor 102. In some embodiments, the optical ranging sensor 102 may be configured to determine one or more proximity characteristics of the target object 110, such as the spatial position, motion, and/or speed of the target object 110. For example, in some embodiments, the optical ranging sensor 102 may be positioned under the electronic display screen of a mobile device and may be configured to detect a target object 110 closer than a pre-determined threshold distance of the optical ranging sensor 102. In an instance in which a target object 110 is closer than the pre-determined threshold distance of the optical ranging sensor 102, the mobile device may deactivate the touch screen, turn off the display, or take any other relevant action.

As further depicted in FIG. 1, unwanted optical noise **120*a*-120*e* may be received at the optical radiation receiver 106 of the optical ranging sensor 102. Unwanted optical noise 120*a*-120*e* is any optical radiation received at the optical radiation receiver 106 that was not transmitted by the optical radiation source 104, or that did not take a direct path from the optical radiation source 104 to the target object 110 and return to the optical radiation receiver 106. For example, as depicted in FIG. 1, unwanted optical noise 120*a* emanates from an unwanted optical noise source, such as an ambient light source external to the optical ranging sensor 102**. An ambient light source may be external light, sun light, another light source, another illumination source emitting laser and/or pulsed or continuous wave laser light, and similar external light sources.

As further depicted in FIG. 1, unwanted optical noise 120*e* may transmit directly from the optical radiation source 104 to the optical radiation receiver through the internal compartment of the optical ranging sensor. Unwanted optical noise 120*c* may result from gaps in a barrier separating the optical radiation source 104 and the optical radiation receiver 106, and/or from insufficient barriers separating the optical radiation source 104 and the optical radiation receiver 106. As further depicted in FIG. 1, unwanted optical noise 120*b-d* may result from transmitted ranging optical radiation 118 reflecting off various surfaces of the optical ranging sensor 102 and/or the external cover 116.

Unwanted optical noise 120*a*-120*e* received from unwanted sources of optical radiation, or from various reflections of the ranging optical radiation 118 not associated with the target object may diminish the ability of the optical ranging sensor 102 to detect ranging optical radiation 118 reflected off the target object 110. An increase in unwanted optical noise 120*a*-120*c* may result in a reduction in the signal-to-noise ratio (SNR) of the ranging optical radiation 118 reflected off the target object 110. As the SNR is reduced due to unwanted optical noise 120*a*-120*e*, the determined proximity characteristics of the target object 110 may become increasingly inaccurate and inconsistent.

Although depicted in FIG. 1 as an optical ranging device, the optical ranging sensor 102 may be any optical sensor configured to transmit optical radiation, and receive the unwanted optical radiation at a receiver. For example, the optical ranging sensor 102 may comprise an optical proximity sensor. In another embodiment, the optical ranging sensor 102 may comprise an imaging device configured to receive reflected optical radiation.

Figures 2A, 2B:
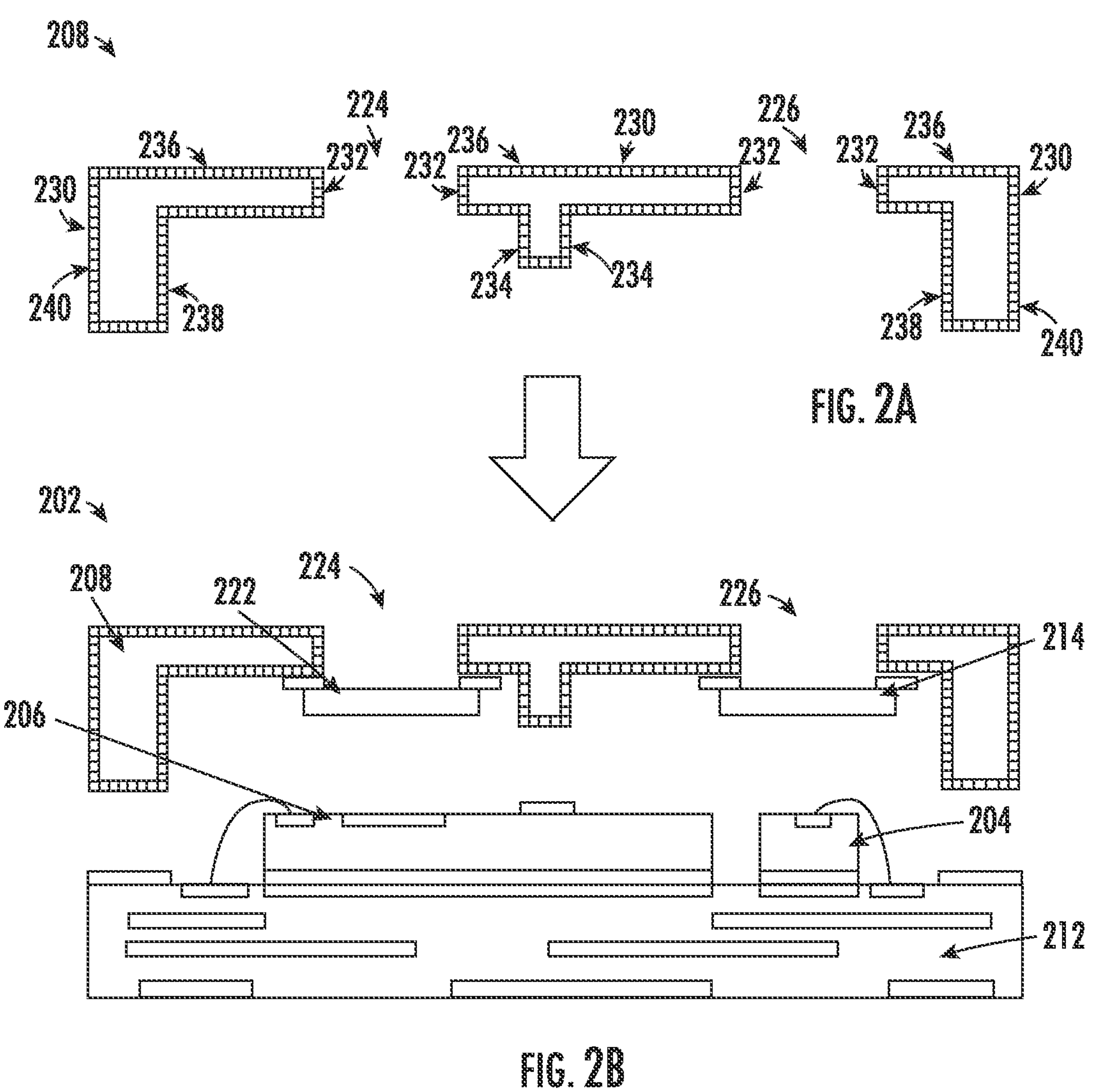
FIG. 2A-FIG. 2B depicts a cross-section view of an example housing cap assembly comprising retroreflective mechanisms in accordance with an example embodiment of the present disclosure.

Referring now to FIG. 2A-FIG. 2B, an example assembly of a housing cap 208 comprising retroreflective mechanisms 230 is depicted. As depicted in FIG. 2A, retroreflective mechanisms 230 are positioned on all surfaces of the housing cap 208 before the housing cap 208 is attached to the substrate 212. The surfaces of the housing cap 208 on which retroreflective mechanisms 230 are disposed include the top surface 236, the opening surfaces 232, the barrier surfaces 234, the internal surfaces 238, and the external surfaces 240.

As depicted in FIG. 2A, the housing cap 208 comprises retroreflective mechanisms 230. A retroreflective mechanism 230 is any structure, substance, object, framework, or other optical device that reflects directed optical radiation back to the source of the optical radiation with minimum scattering. A retroreflective mechanism 230 may comprise optical elements and/or reflective surfaces to reflect incident light back at an angle near the angle of incidence. In some embodiments, retroreflective mechanisms 230 may include corner retroreflectors as described further in relation to FIG. 6A and/or cat's eye retroreflectors as described further in relation to FIG. 6B. Other retroreflective mechanisms 230 may include retroreflective paints and/or retroreflective tapes. A retroreflective mechanism 230 may be applied to the surface of the housing cap 208 as part of the manufacturing process, after the housing cap is manufactured but before the housing cap 208 is attached to the substrate 212, and/or after the housing cap 208 is attached to the substrate 212. By applying a retroreflective mechanism 230 to the surface of the housing cap 208, unwanted optical noise encountering the retroreflective mechanism 230 on the surface of the housing cap 208 will be reflected back toward the source of the unwanted optical noise, for example, the optical radiation source 204, an ambient noise source, or another source of unwanted optical noise.

As depicted in FIG. 2A, the housing cap 208 comprises a plurality of internal surfaces 238, external surfaces 240, and opening surfaces 232. The internal surfaces 238 are any surfaces within the interior cavity formed by the housing cap 208 and adjacent to the internal components (e.g., the optical radiation source 204, the optical radiation receiver 206) of the optical ranging sensor 202. The internal surfaces 238 include the barrier surfaces 234. The barrier surfaces 234 are any surfaces of the housing cap 208 on the internal barrier dividing the optical radiation source 204 from the optical radiation receiver 206. In some embodiments, one or more of the internal surfaces 238 may comprise a retroreflective mechanism 230. For example, the barrier surface 234 adjacent to the optical radiation source 204 may include a retroreflective mechanism 230 preventing unwanted optical noise, such as crosstalk unwanted optical noise 120*e* depicted in FIG. 1, from transmitting directly from the optical radiation source 204 to the optical radiation receiver 206 through the internal cavity of the optical ranging sensor 202.

The external surfaces 240 of the housing cap 208 are any surfaces exterior to the internal cavity defined by the housing cap 208. The external surfaces 240 include the top surface 236. The top surface 236 is the surface of the housing cap 208 exterior to the internal cavity defined by the housing cap 208 comprising the transmission opening 226 and the receiving opening 224 through which the ranging optical radiation (e.g., ranging optical radiation 118 as described in relation to FIG. 1) is transmitted and received. In some embodiments, one or more of the external surfaces 240 may comprise a retroreflective mechanism 230. For example, the top surface 236 may include a retroreflective mechanism 230 preventing unwanted optical noise, such as crosstalk unwanted optical noise 120*b*-120*e* depicted in FIG. 1, from transmitting directly from the optical radiation source 204 to the optical radiation receiver 206 by reflecting off the top surface 236.

The opening surfaces 232 include any surface of the housing cap 208 defining an opening in the housing cap 208 into the internal cavity, for example, the receiving opening 224 and the transmission opening 226. In some embodiments, one or more of the opening surfaces 232 may comprise a retroreflective mechanism 230. For example, the opening surface 232 defining the receiving opening 224 may include a retroreflective mechanism 230 preventing unwanted optical noise, such as ambient unwanted optical noise 120*a* depicted in FIG. 1, from reflecting off the opening surfaces 232 and transmitting to the optical radiation receiver 206.

As further depicted in FIG. 2B, the housing cap 208 comprising the retroreflective mechanisms 230 is attached to a substrate 212, forming a protective barrier around the optical radiation source 204, the optical radiation receiver 206, and other internal components of the optical ranging sensor 202. In addition, a transmitting optical structure 214 and a receiving optical structure 222 are attached to the housing cap 208 at the transmission opening 226 and the receiving opening 224 respectively, to further protect the internal components of the optical ranging sensor 202.

Figure 3:
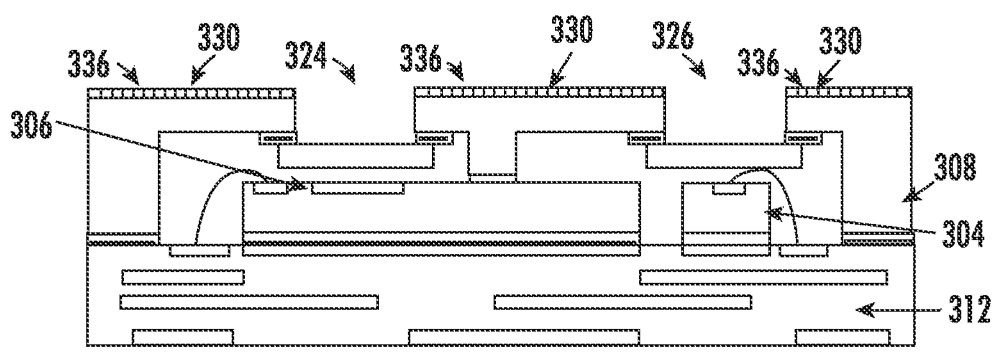
FIG. 3 depicts a cross-section view of an example housing cap comprising retroreflective mechanisms positioned on the top surface of the housing cap in accordance with an example embodiment of the present disclosure.

Referring now to FIG. 3, an example embodiment of an optical ranging sensor 302 comprising retroreflective mechanisms 330 is provided. As depicted in FIG. 3, the example optical ranging sensor 302 comprises a housing cap 308 attached to a substrate 312, the housing cap 308 defining an internal cavity comprising the internal electrical components of the optical ranging sensor 302, such as an optical radiation source 304 and an optical radiation receiver 306. As further depicted in FIG. 3, the housing cap 308 includes a transmission opening 326 through which ranging optical radiation (e.g., ranging optical radiation 118 as depicted in FIG. 1) may be transmitted by the optical radiation source 304. In addition, the housing cap 308 includes a receiving opening 324 through which reflected ranging optical radiation may be received at the optical radiation receiver 306. The example optical ranging sensor 302 further includes retroreflective mechanisms 330 disposed across the top surface 336 of the housing cap 308.

In some embodiments, due to manufacturing difficulty, overall cost, or other limiting factors, retroreflective mechanisms 330 may be positioned on only selected portions of the housing cap 308. As depicted in FIG. 3, the example retroreflective mechanisms 330 are positioned to substantially cover the top surface 336 of the housing cap 308. As depicted in FIG. 1, the top surface 336 of the housing cap 308 may be a significant source of unwanted optical noise due to crosstalk reflections. The retroreflective mechanisms 330 placed on the top surface 336 of the housing cap 308 redirect the unwanted optical noise to the source of the optical radiation, for example, the optical radiation source 304.

Figure 4:
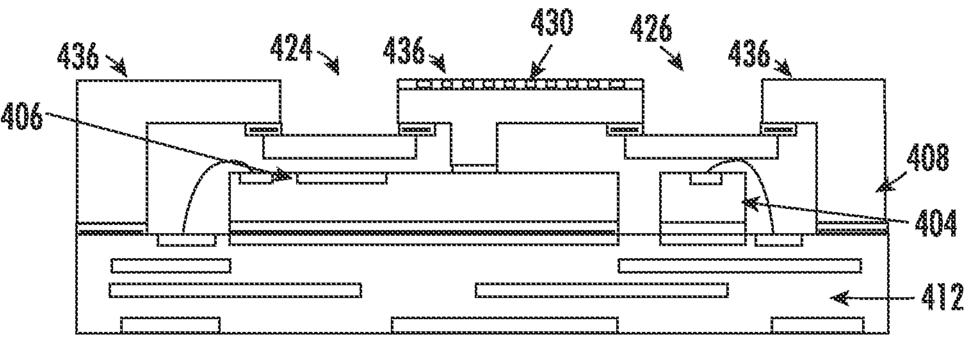
FIG. 4 depicts a cross-section view of an example housing cap comprising retroreflective mechanisms positioned on the top surface of the housing cap between the transmission opening and the receiving opening in accordance with an example embodiment of the present disclosure.

Referring now to FIG. 4, an example embodiment of an optical ranging sensor 402 comprising retroreflective mechanisms 430 is provided. As depicted in FIG. 4, the example optical ranging sensor 402 comprises a housing cap 408 attached to a substrate 412, the housing cap 408 defining an internal cavity comprising the internal electrical components of the optical ranging sensor 402, such as an optical radiation source 404 and an optical radiation receiver 406. As further depicted in FIG. 4, the housing cap 408 includes a transmission opening 426 through which ranging optical radiation (e.g., ranging optical radiation 118 as depicted in FIG. 1) may be transmitted by the optical radiation source 404. In addition, the housing cap 408 includes a receiving opening 424 through which reflected ranging optical radiation may be received at the optical radiation receiver 406. The example optical ranging sensor 402 further includes retroreflective mechanisms 430 disposed on the top surface 436 of the housing cap 408 between the transmission opening 426 and the receiving opening 424.

As described herein, in some embodiments, retroreflective mechanisms 330 may be positioned on limited portions of the housing cap 408 due to manufacturing difficulty, overall cost, or other limiting factors. As depicted in FIG. 4, the example retroreflective mechanisms 430 are positioned to on the top surface 436 of the housing cap 308 between the transmission opening 426 and the receiving opening 424. As depicted in FIG. 1, the top surface 436 of the housing cap 408 between the transmission opening 426 and the receiving opening 424 may be a significant source of unwanted optical noise. For example, optical radiation emitted from the optical radiation source 404 may reflect off various surfaces of the housing cap, an electronic screen or other external cover, the top surface of the housing cap, and other surfaces. In an instance in which unwanted optical noise due to such crosstalk reflections reaches the optical radiation receiver 406, invalid or inaccurate proximity results may be determined. The retroreflective mechanisms 430 placed on the top surface 436 of the housing cap 408 between the transmission opening 426 and the receiving opening 424 redirect the unwanted optical noise to the source of the optical radiation, for example, the optical radiation source 404.

Figure 5:
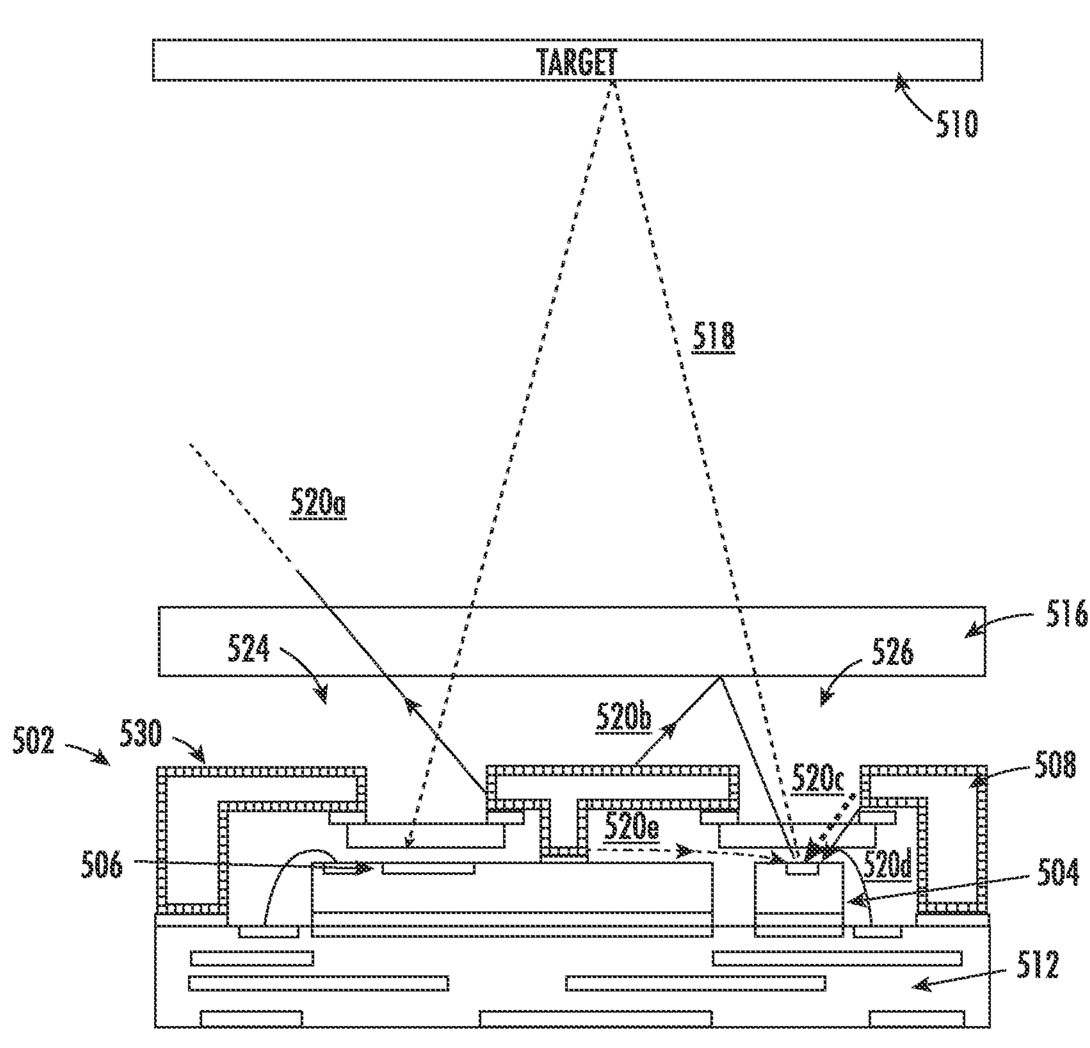
FIG. 5 depicts a cross-section view of an example optical ranging system comprising retroreflective mechanisms positioned to reflect unwanted optical noise away from the optical radiation receiver in accordance with an example embodiment of the present disclosure.

Referring now to FIG. 5, an example optical ranging system 500 comprising an optical ranging sensor 502 including retroreflective mechanisms 530 is provided. As depicted in FIG. 5, the optical ranging system 500 includes an optical ranging sensor 502 comprising an optical radiation source 504 configured to direct ranging optical radiation 518 through a transmission opening 526 of a housing cap 508, through an external cover 516 (e.g., screen), and toward a target object 510. The ranging optical radiation 518 is reflected by the target object 510 back through a receiving opening 524 in the housing cap 508 to be received at an optical radiation receiver 506. As further depicted in FIG. 5, the optical radiation source 504 and the optical radiation receiver 506 are protected by a housing cap 508 attached to a substrate 512 and defining an interior cavity in which the internal electrical components of the optical ranging sensor 502 are disposed. As illustrated in FIG. 5, the surfaces of the housing cap 508 include retroreflective mechanisms 530 positioned to redirect optical radiation from various sources of unwanted noise (e.g., ambient unwanted optical noise 520*a*, crosstalk unwanted optical noise 520*b*-520*c*) in a direction at or near the incident angle of the directed optical radiation.

As depicted in FIG. 5, unwanted noise may enter the optical ranging system 500 from a variety of sources of optical radiation. For example, unwanted noise (e.g., ambient unwanted optical noise 520*a*) may enter the optical ranging system 500 from an external source. Additionally, optical radiation emitted from the optical radiation source 504 may reflect off various surfaces of the housing cap, the electronic screen or other external cover 516, or other structures on or near the optical ranging sensor 502 toward the optical radiation receiver 506. As shown in FIG. 5, the surface of the housing cap 508 comprises retroreflective mechanisms 530. The retroreflective mechanisms 530 redirect incident light in the direction from which the incident light encounters the retroreflective mechanisms 530 on the surface of the housing cap 508. Thus, the unwanted optical noise 520*a*-520*e* is prevented from reflecting toward the optical radiation receiver 506.

Figure 6A:
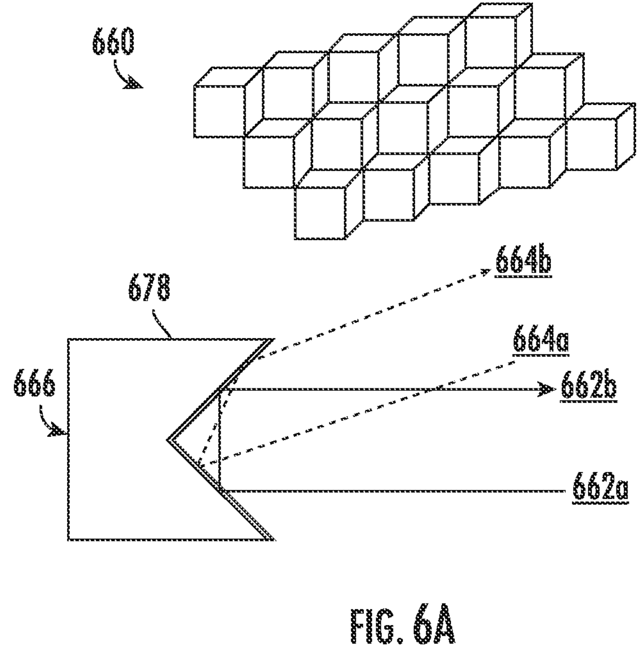
FIG. 6A-FIG. 6B illustrate cross-section views of example retroreflective mechanisms including a corner retroreflector and a cat's eye retroreflector in accordance with an example embodiment of the present disclosure.

Referring now to FIG. 6A, an example retroreflective mechanism (e.g., retroreflective mechanism 230, 330, 430, 530) is provided. As depicted in FIG. 6A, a corner retroreflector surface 660 may be positioned on one or more surfaces of a housing cap (e.g., housing cap 108, 208, 308, 408, 508) as a retroreflective mechanism. As depicted, a corner retroreflector 666 comprises an array of three mutually perpendicular reflective surfaces 678 placed to form the internal corner of a cube. Incident light 662*a*, 664*a* encountering the corner retroreflector 666 is directed back to the source of the incident light 662*a*, 664*a* as retroreflected light 662*b*, 664*b*.

As further depicted in FIG. 6A, a plurality of corner retroreflectors 666 may be positioned in a corner retroreflector surface 660. A corner retroreflector surface 660 may be manufactured on one or more surfaces of the housing cap as part of the manufacturing process of the housing cap. In some embodiments, the corner retroreflector 666 and/or corner retroreflector surface 660 may be disposed on one or more surfaces of the housing cap after the housing cap is manufactured.

Figure 6B:
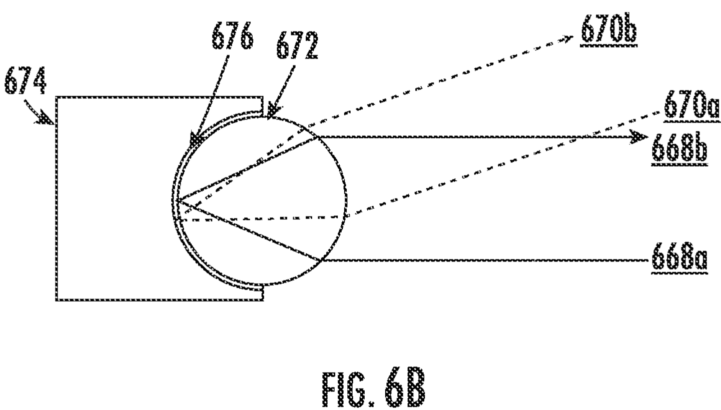

Referring now to FIG. 6B, an example retroreflective mechanism (e.g., retroreflective mechanism 230, 330, 430, 530) is provided. As depicted in FIG. 6B, a cat's eye retroreflector 674 may be positioned on one or more surfaces of a housing cap (e.g., housing cap 108, 208, 308, 408, 508) as a retroreflective mechanism. As depicted in FIG. 6B, a cat's eye retroreflector 674 typically comprises a transparent sphere 672 and a spherical mirror 676. Incident light 668*a*, 670*a* entering the cat's eye retroreflector 674 is directed back to the source of the Incident light 668*a*, 670*a* as retroreflected light 668*b*, 670*b*.

In some embodiments, a plurality of cat's eye retroreflectors 674 may be positioned across a surface of the housing cap. Cat's eye retroreflectors 674 may be manufactured on one or more surfaces of the housing cap as part of the manufacturing process of the housing cap. In some embodiments, the cat's eye retroreflectors 674 may be disposed on one or more surfaces of the housing cap after the housing cap is manufactured.

Figure 7:
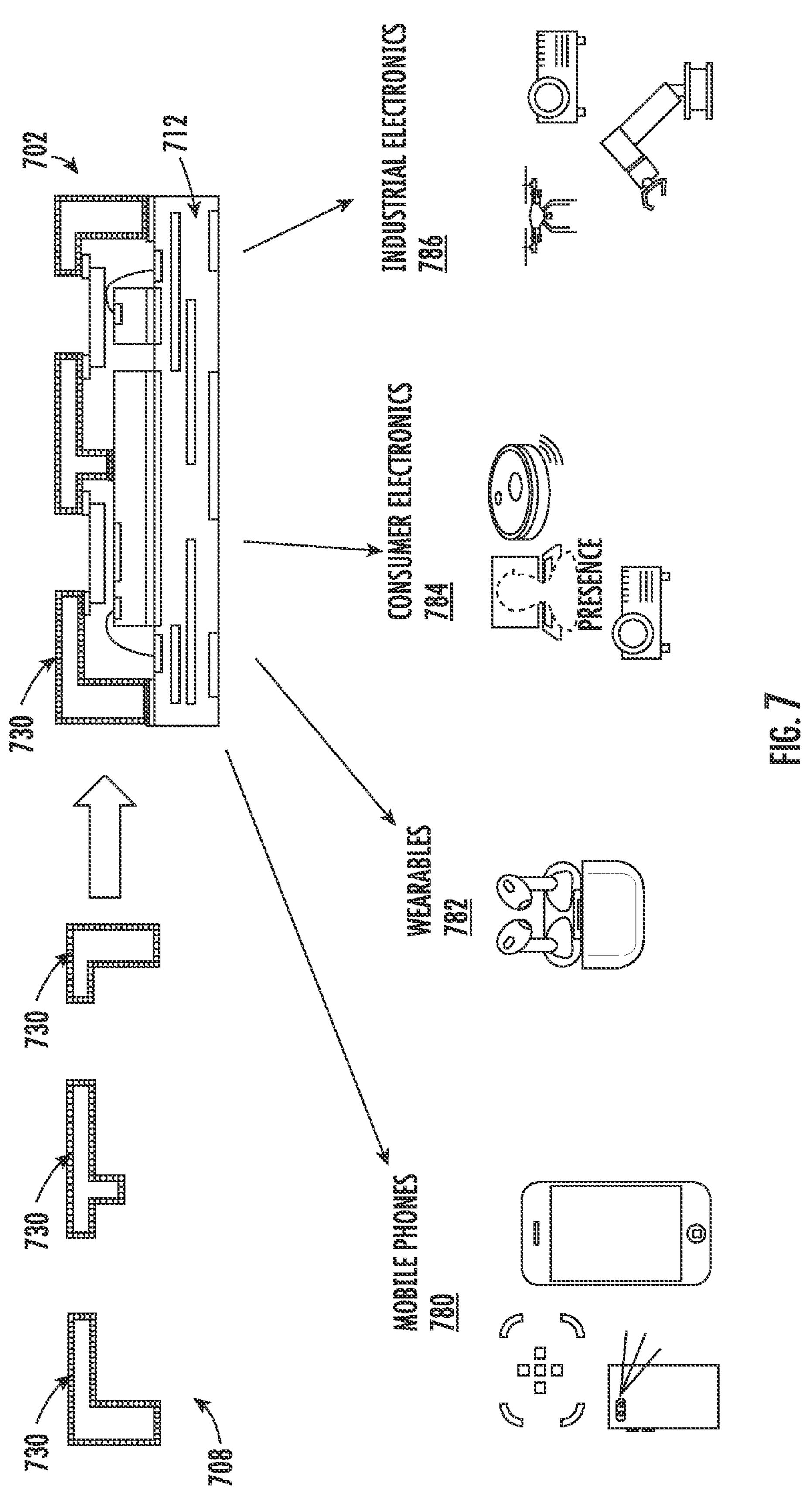
FIG. 7 depicts a plurality of example electronic systems utilizing an optical ranging sensor in accordance with an example embodiment of the present disclosure.

Referring now to FIG. 7, a plurality of example electronic systems configured to utilize an optical ranging sensor 702 to determine a proximity of a target object are provided. As depicted in FIG. 7, the housing cap 708 comprises a retroreflective mechanism 730 on the surfaces of the housing cap 708. The housing cap 708 is attached to a substrate 712, forming a protective barrier defining an internal cavity in which the internal electrical components of a optical ranging sensor 702 are disposed. As described herein, the retroreflective mechanisms 730 disposed on one or more surfaces of the housing cap 708 may re-direct unwanted optical noise (e.g., unwanted optical noise 120*a*-120*c*. 520*a*-520*c*) toward the source of the unwanted optical noise. By re-directing the unwanted optical noise in the direction of the source, the unwanted optical noise is re-directed away from the optical radiation receiver of the optical ranging sensor 702.

As further depicted in FIG. 7, various electronic systems including but not limited to mobile phones 780, wearables 782, consumer electronics 784, and industrial electronics 786 may benefit from utilizing an optical ranging sensor 702 in accordance with the embodiments described herein. By reducing the unwanted optical noise received at the optical radiation receiver of the optical ranging sensor 702, the SNR of the ranging optical radiation reflected off the target object is increased. The increased SNR results in improved accuracy and consistency of the optical ranging sensor 702.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that utilizes an optical source to determine a proximity and or range of a target object. For example, mobile devices such as phones, tablets, and laptops; wearable electronic devices such as watches and ear buds; consumer electronics such as robotic vacuums and projection systems; industrial electronics such as unmanned aerial vehicles, robotics; and so forth.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An optical ranging sensor configured to determine a proximity of a target object comprising:

a housing cap, comprising:
 a transmission opening; and
 a receiving opening;

an optical radiation source positioned to direct ranging optical radiation through the transmission opening toward the target object;

an optical radiation receiver positioned to receive ranging optical radiation reflected off the target object through the receiving opening; and a retroreflective mechanism implemented on a surface of the housing cap,
 wherein the retroreflective mechanism directs unwanted optical noise back towards an unwanted optical noise source and away from the optical radiation receiver;

wherein the proximity of the target object is determined based on one or more properties of the ranging optical radiation.

2. The optical ranging sensor of claim 1, wherein the housing cap further comprises a top surface opposite the optical radiation receiver, wherein the retroreflective mechanism is disposed such that the top surface of the housing cap is substantially covered.

3. The optical ranging sensor of claim 1, wherein a portion of the housing cap between the receiving opening and the transmission opening comprises the retroreflective mechanism.

4. The optical ranging sensor of claim 1, wherein one or more opening surfaces defining the transmission opening and the receiving opening comprise the retroreflective mechanism.

5. The optical ranging sensor of claim 1, wherein one or more barrier surfaces positioned between the optical radiation source and the optical radiation receiver comprises the retroreflective mechanism.

6. The optical ranging sensor of claim 1, further comprising:

a receiving optical structure positioned between the optical radiation receiver and the target object,
 wherein the receiving optical structure is configured to direct the ranging optical radiation at the optical radiation receiver.

7. The optical ranging sensor of claim 1, further comprising:

a transmitting optical structure positioned between the optical radiation source and the target object,
 wherein the transmitting optical structure is configured to direct the ranging optical radiation at the target object.

8. The optical ranging sensor of claim 1, wherein the retroreflective mechanism comprises a corner retroreflector.

9. The optical ranging sensor of claim 1, wherein the retroreflective mechanism comprises a cat's eye retroreflector.

10. The optical ranging sensor of claim 1, wherein the retroreflective mechanism comprises at least one of retroreflective paint and retroreflective tape.

11. The optical ranging sensor of claim 1, wherein the one or more properties of the ranging optical radiation comprises at least one of a time-of-flight of the optical radiation and an intensity of the optical radiation.

12. The optical ranging sensor of claim 1, wherein the proximity of the target object includes at least one of a distance of the target object from the optical ranging sensor, a position of the target object relative to the optical ranging sensor, and a speed of the target object.

13. An electronic system configured to determine a proximity of a target object comprising:
- an external cover; and
- an optical ranging sensor disposed on an interior side of the external cover, opposite the target object, the optical ranging sensor comprising:
  - a housing cap, comprising:
    - a transmission opening; and
    - a receiving opening;
  - an optical radiation source positioned to direct ranging optical radiation through the transmission opening toward the target object;
  - an optical radiation receiver positioned to receive ranging optical radiation reflected off the target object through the receiving opening; and
  - a retroreflective mechanism disposed on a surface of the housing cap,
    - wherein the retroreflective mechanism directs unwanted optical noise back towards an unwanted optical noise source away from the optical radiation receiver;
- wherein the proximity of the target object is determined based on one or more properties of the ranging optical radiation.

14. The electronic system of claim 13, wherein the housing cap further comprises a top surface opposite the optical radiation receiver, wherein the retroreflective mechanism is disposed such that the top surface of the housing cap is substantially covered.

15. The electronic system of claim 13, wherein a portion of the housing cap between the receiving opening and the transmission opening comprises the retroreflective mechanism.

16. The electronic system of claim 13, wherein one or more opening surfaces defining the transmission opening and the receiving opening comprise the retroreflective mechanism.

17. The electronic system of claim 13, wherein one or more barrier surfaces positioned between the optical radiation source and the optical radiation receiver comprises the retroreflective mechanism.

18. The electronic system of claim 13, wherein the retroreflective mechanism comprises at least one of a corner retroreflector and a cat's eye retroreflector.

19. The electronic system of claim 13, wherein the retroreflective mechanism comprises at least one of retroreflective paint and retroreflective tape.

20. The electronic system of claim 13, wherein the proximity of the target object includes at least one of a distance of the target object from the optical ranging sensor, a position of the target object relative to the optical ranging sensor, and a speed of the target object.

* * * * *